US011498535B2

(12) United States Patent
Suzuki et al.

(10) Patent No.: US 11,498,535 B2
(45) Date of Patent: Nov. 15, 2022

(54) CONTROL APPARATUS FOR ELECTRIC VEHICLE, CONTROL SYSTEM FOR ELECTRIC VEHICLE, AND CONTROL METHOD FOR ELECTRIC VEHICLE

(71) Applicant: Hitachi Automotive Systems, Ltd., Hitachinaka (JP)

(72) Inventors: Keisuke Suzuki, Hitachinaka (JP); Kazuya Takahashi, Sagamihara (JP); Satoshi Kaneko, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 146 days.

(21) Appl. No.: 16/961,560

(22) PCT Filed: Jan. 7, 2019

(86) PCT No.: PCT/JP2019/000066
§ 371 (c)(1),
(2) Date: Jul. 10, 2020

(87) PCT Pub. No.: WO2019/138962
PCT Pub. Date: Jul. 18, 2019

(65) Prior Publication Data
US 2020/0339081 A1 Oct. 29, 2020

(30) Foreign Application Priority Data
Jan. 15, 2018 (JP) .............................. JP2018-004437

(51) Int. Cl.
*B60T 8/17* (2006.01)
*B60L 7/26* (2006.01)

(52) U.S. Cl.
CPC .................................. *B60T 8/17* (2013.01); *B60L 7/26* (2013.01); *B60L 2240/12* (2013.01); *B60L 2240/423* (2013.01); *B60T 2270/604* (2013.01)

(58) Field of Classification Search
CPC ........ B60T 8/17; B60T 2270/604; B60L 7/26; B60L 2240/12; B60L 2240/423; B60L 7/10; B60L 7/18; B60L 7/22
See application file for complete search history.

(56) References Cited

U.S. PATENT DOCUMENTS 9,387,765 B2    7/2016  Naito et al.
10,336,195 B2*  7/2019  Suzuki ............... B60L 15/2009
(Continued)

FOREIGN PATENT DOCUMENTS

JP    2016-28913 A    3/2016
JP    2017-34842 A    2/2017
WO    WO 2013/115042 A1    8/2013

OTHER PUBLICATIONS

Translation of Japanese Patent No. 2017034842 obtained from website: https://worldwide.espacenet.com on Mar. 1, 2022.*
(Continued)

*Primary Examiner* — Pamela Rodriguez
(74) *Attorney, Agent, or Firm* — Crowell & Moring LLP (57) ABSTRACT

An apparatus includes a control apparatus for an electric vehicle. The control apparatus outputs an instruction to reduce the first regenerative braking force according to the physical amount regarding the stroke of the brake pedal to the electric motor. The control apparatus also outputs an instruction to add a braking force corresponding to a third regenerative braking force, which is a regenerative braking force corresponding to an amount of the reduction in the first regenerative braking force, to the brake actuation braking force when the signal regarding the pressing of the brake pedal is input after the signal regarding the return of the pressed accelerator pedal is input.

9 Claims, 6 Drawing Sheets

(56) References Cited

U.S. PATENT DOCUMENTS

2014/0379190 A1 12/2014 Sawada
2020/0189398 A1* 6/2020 Suzuki .................. B60T 8/1766

OTHER PUBLICATIONS

International Search Report (PCT/ISA/210) issued in PCT Application No. PCT/JP2019/000066 dated Mar. 26, 2019 with English translation (three (3) pages).
Japanese-language Written Opinion (PCT/ISA/237) issued in PCT Application No. PCT/JP2019/000066 dated Mar. 26, 2019 with English translation (seven (7)s pages).
Supplementary European Search Report issued in European Application No. 19738421.7 dated Feb. 9, 2021 (ten (10) pages).

* cited by examiner

CONTROL APPARATUS FOR ELECTRIC VEHICLE, CONTROL SYSTEM FOR ELECTRIC VEHICLE, AND CONTROL METHOD FOR ELECTRIC VEHICLE

TECHNICAL FIELD

The present invention relates to a control apparatus, a control system, and a control method for an electric vehicle.

BACKGROUND ART

As a conventional technique, PTL 1 discloses a control apparatus for an electric vehicle that employs a technique for suppressing pitching that otherwise would occur immediately after the vehicle is stopped by reducing a regenerative braking force just before the vehicle is stopped, when braking the vehicle based on a total braking force of the regenerative braking force generated when an accelerator pedal is returned after being pressed (hereinafter referred to as an accelerator de-actuation regenerative braking force) and a frictional braking force generated when a brake pedal is pressed.

CITATION LIST

Patent Literature

[PTL 1] Japanese Patent Application Public Disclosure No. 2016-28913

SUMMARY OF INVENTION

Technical Problem

However, PTL 1 leads to a reduction in the total braking force because reducing the accelerator de-actuation regenerative braking force just before the vehicle is stopped. At this time, if the total braking force contains the regenerative braking force derived from the return of the pressed accelerator pedal at a high ratio to the frictional braking force derived from the pressing of the brake pedal, the reduction therein easily leaves the driver with an impression that the deceleration is diminished, thereby raising a possibility of evoking an uncomfortable feeling.

An object of the present invention is to provide a control apparatus for an electric vehicle that can prevent the uncomfortable feeling due to the diminishment of the deceleration just before the vehicle is stopped.

Solution to Problem

According to one embodiment of the present invention, a control apparatus outputs an instruction to generate a first regenerative braking force corresponding to a regenerative braking force on an electric motor when a signal regarding a return of a pressed accelerator pedal is input from an accelerator pedal sensor. The accelerator pedal sensor is configured to detect a physical amount regarding a stroke of the accelerator pedal of the electric vehicle. The control apparatus outputs an instruction to generate a brake actuation braking force on a wheel when a signal regarding pressing of a brake pedal is input from a brake pedal sensor. The brake pedal sensor is configured to detect a physical amount regarding a stroke of the brake pedal of the electric vehicle. The control apparatus outputs, to the electric motor, an instruction to reduce a total value of the first regenerative braking force and the brake actuation braking force by a braking force corresponding to a second regenerative braking force, which is a regenerative braking force smaller than the first regenerative braking force, when an output value lower than a predetermined speed is input from a vehicle body speed detection sensor. The vehicle body speed detection sensor is configured to detect a physical amount regarding a vehicle body speed of the electric vehicle.

Therefore, the control apparatus for the electric vehicle can prevent the driver from feeling that the deceleration is diminished just before the vehicle is stopped.

DESCRIPTION OF EMBODIMENTS

First Embodiment

Figure 1:
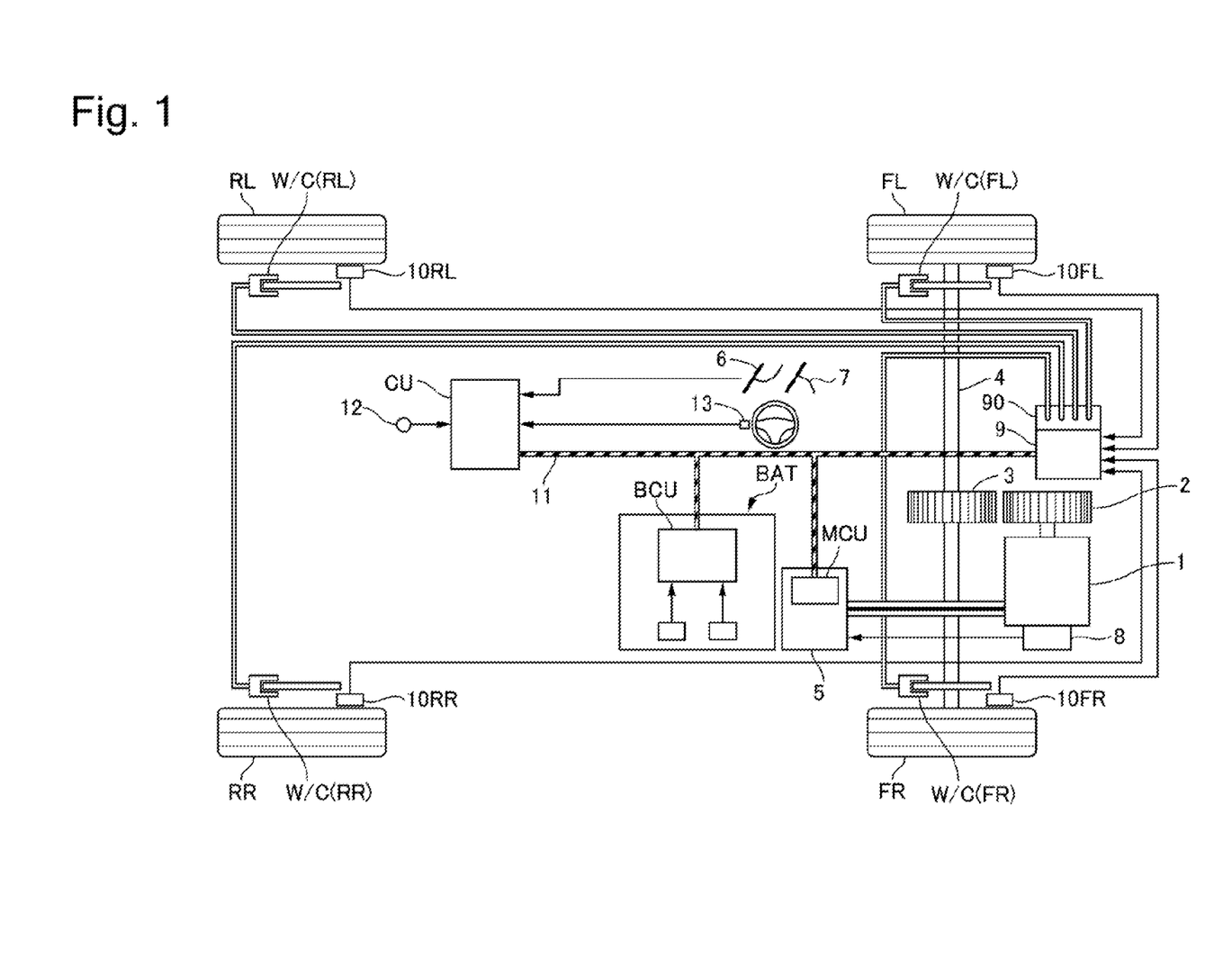
FIG. 1 is a system diagram of an electric vehicle according to a first embodiment.

FIG. 1 is a system diagram of an electric vehicle according to a first embodiment. The electric vehicle according to the first embodiment is a front-wheel-drive vehicle, in which front wheels FL and FR are driven by an electric motor 1. A differential gear 3 is connected to the electric motor 1 via a speed reduction mechanism 2. A drive shaft 4 is connected to the differential gear 3. The front wheels FL and FR are connected to the drive shaft 4. An inverter 5 includes a motor control unit MCU, which controls the electric motor 1.

A high-voltage battery BAT includes a battery control unit BCU, which controls electric power to supply. The high-voltage battery BAT is a battery module formed by connecting a plurality of batteries, and the battery control unit BCU controls electric power to supply from one battery module to the electric motor 1.

The electric vehicle includes a brake pedal sensor 6, an accelerator pedal sensor 7, a resolver 8, an acceleration sensor 12, a steering angle sensor 13, and a vehicle speed sensor 14. The brake pedal sensor 6 outputs a brake pedal stroke signal. The accelerator pedal sensor 7 outputs an accelerator position signal, which is a physical amount regarding the stroke of an accelerator pedal. The resolver 8 outputs a motor rotational speed signal including a rotational direction of the electric motor 1. The acceleration sensor 12 detects a longitudinal acceleration Xg and a lateral acceleration Yg of the vehicle. The steering angle sensor 13 detects a steering angle θ of a steering wheel. The vehicle speed sensor 14 detects a vehicle body speed VSP of the vehicle. A vehicle control unit CU receives a range position signal from a shift lever, the brake pedal stroke signal from the brake pedal sensor 6, the accelerator position signal from the accelerator pedal sensor 7, and a steering angle signal from the steering angle sensor 13. Further, the vehicle control unit CU receives the motor rotational speed signal from the resolver 8 via the motor control unit MCU. The vehicle control unit CU calculates a driving torque instruction value directed to the electric motor 1 based on the accelerator position and the like, and drives the electric motor 1 according to the driving torque instruction value.

A brake hydraulic unit 90 is a unit that generates a frictional braking force, and supplies a brake hydraulic pressure to each of wheel cylinders W/C(FL), W/C(FR), W/C(RL), and W/C(RR), which press brake pads against calipers mounted on the respective wheels. The brake hydraulic unit 90 is connected to a not-illustrated master cylinder, and also includes a pump and a plurality of electromagnetic valves. Then, the brake hydraulic unit 90 can supply a desired brake hydraulic pressure to each of the wheels independently of a master cylinder pressure by driving the pump and also activating the electromagnetic valves based on an instruction signal from a brake controller 9, which will be described below. By this operation, the brake hydraulic unit 90 generates a desired frictional braking force on each of the wheels. The brake controller 9 is connected to wheel speed sensors 10FL, 10FR, 10RL, and 10RR (hereinafter also referred to as simply 10) mounted on the respective wheels, and receives rotational speed signals of the respective wheels. The wheel speed sensors 10 each detect a wheel speed from a cycle of an electromagnetic pulse. The brake controller 9 adjusts brake fluid to supply to a brake unit using a hydraulic pressure at each of the wheels to control a braking torque of each of the wheels based on a driver's brake operation amount detected by the brake pedal sensor 6. Information communication among the motor control unit MCU, the vehicle control unit CU, and the brake controller 9 is carried out via a CAN communication line 11.

Figure 2:
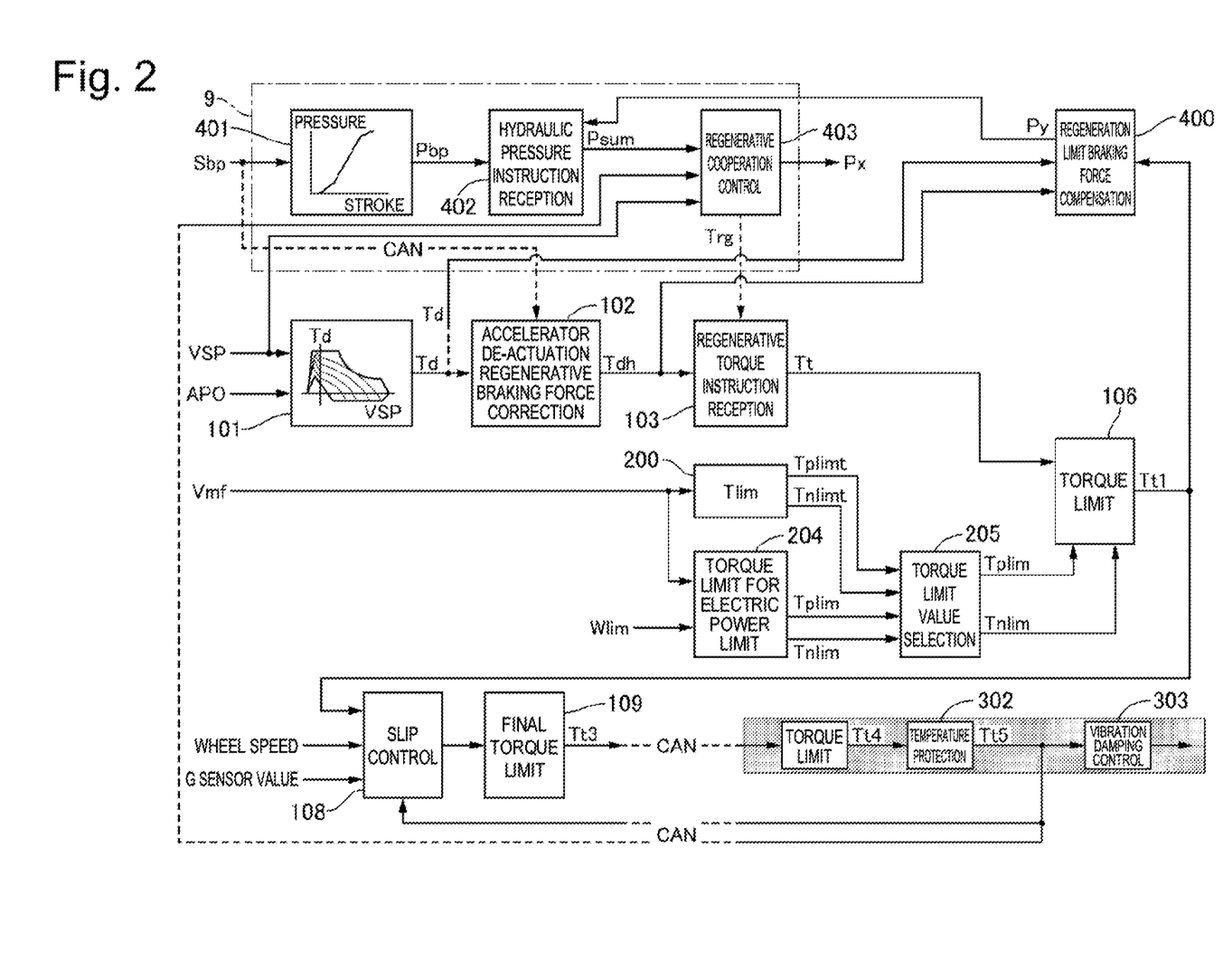
FIG. 2 is a control block diagram of the electric vehicle according to the first embodiment.

FIG. 2 is a control block diagram of the electric vehicle according to the first embodiment. The control block diagram illustrates control blocks of the vehicle control unit CU and the brake controller 9.

(Details of Brake Controller) A driver request brake hydraulic pressure calculation portion 401 inputs a driver's brake pedal stroke Stroke detected by the brake pedal sensor 6, and calculates a driver request brake hydraulic pressure Pbp based on a preset map. This map is a map set while a running feeling is checked from an experiment or the like.

A hydraulic pressure instruction reception portion 402 outputs a total hydraulic pressure instruction Px based on a braking force compensation hydraulic pressure instruction value Py calculated by a regeneration limit braking force compensation portion 400 in the vehicle control unit CU, which will be described below, and the driver request brake hydraulic pressure Pbp. The hydraulic pressure instruction reception portion 402 outputs a value acquired by adding the braking force compensation hydraulic pressure instruction value Py to the driver request brake hydraulic pressure Pbp, as the total hydraulic pressure instruction Psum. The braking force compensation hydraulic pressure instruction value Py will be described below.

Figure 3:
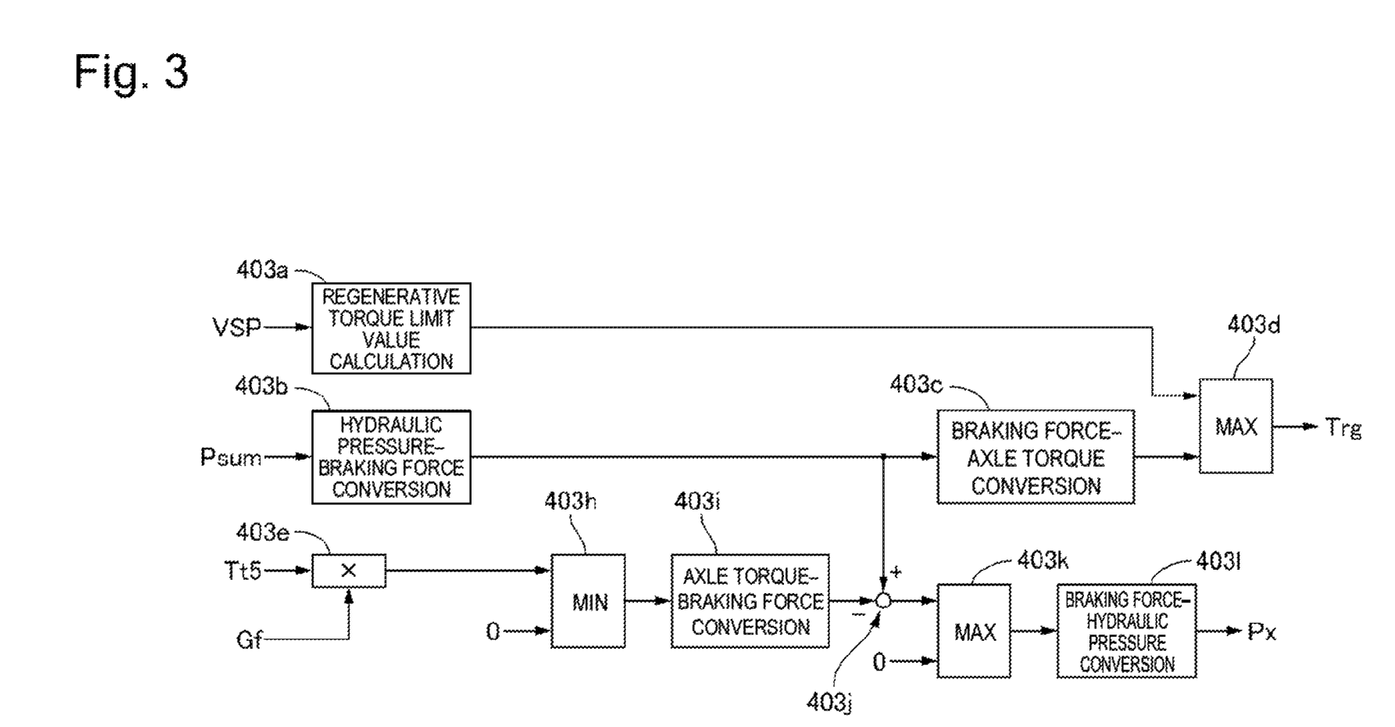
FIG. 3 is a control block diagram illustrating a regenerative cooperation control portion according to the first embodiment.

A regenerative cooperation control portion 403 outputs a request regenerative torque Trg and a brake hydraulic pressure instruction Px based on the vehicle speed VSP, the total hydraulic pressure instruction Psum, a front wheel torque instruction value Tt5 as a torque instruction before vibration damping control, which will be described below, and a speed reduction ratio Gf of the speed reduction mechanism 2 on the front wheel side. FIG. 3 is a control block diagram illustrating the regenerative cooperation control portion according to the first embodiment. A regenerative torque limit value calculation portion 403*a* calculates a regenerative torque limit value based on the vehicle speed VSP. This limit value is a value prepared for setting an upper limit on a generatable regenerative torque according to the vehicle speed in advance, and is set in light of the characteristic of the motor and the stability of the vehicle. Further, an extremely low vehicle speed leads to a reduction in the electric power generation amount and makes the electric power regeneration impossible, and therefore the upper limit on the regenerative torque is set to zero in this case. Therefore, the regenerative cooperation control portion performs replacement control of reducing the regenerative torque toward zero and compensating for the reduction in the regenerative torque by an increase in the frictional braking force when the vehicle speed matches or falls below a predetermined vehicle speed indicating the extremely low vehicle speed at the time of the regenerative cooperation control. The regenerative torque limit value is a value leading to the generation of the braking force when being a negative value.

A hydraulic pressure-braking force conversion portion 403*b* converts the total hydraulic pressure instruction Psum, which indicates the braking force requested to the vehicle, from the hydraulic pressure into the braking force. The hydraulic pressure instruction is a value leading to the generation of the braking force when being a positive value. A braking force-axle torque conversion portion 403*c* converts the converted braking force into an axle torque. The axle torque is a value leading to the generation of the braking force when being a negative value. A limit portion 403*d* outputs the larger one of the regenerative torque limit value set to a negative value and the axle torque set to a negative value as the request regenerative torque Trg. Therefore, no request is issued for a braking force greater than a braking force that would be generated according to the regenerative torque limit value.

An axle torque calculation portion 403*e* calculates a front wheel axle torque by multiplying the motor torque instruction value Tt5 calculated in the motor control unit MCU, which will be described below, by the gear ratio Gf of the speed reduction mechanism 2. The motor torque instruction value Tt5 is a torque before a vibration damping torque is added by a vibration damping control portion 303, and indicates an actual regenerative braking torque. This axle torque has a positive value for a torque on the acceleration side, and has a negative value for a torque on the deceleration side (the regenerative side).

A torque extraction portion 403*h* selects and outputs the smaller one of the calculated axle torque of the vehicle and zero. This selection is intended to extract only the axle torque calculated as a negative value and ignore the acceleration torque calculated as a positive value. An axle torque-braking force conversion portion 403*i* converts the extracted axle torque into the braking force. When the axle torque is a negative value, the braking force is converted as a positive value.

A difference calculation portion 403*j* calculates a hydraulic pressure difference, which is a braking force corresponding to insufficiency that would occur if the regenerative torque is used alone, by subtracting the value converted from the motor torque instruction value Tt5 into the braking force from the value converted from the total hydraulic pressure instruction Psum into the braking force. Now, when the hydraulic pressure difference is a positive value, this means a state in which the regenerative braking force falls short of the requested braking force, and the braking force should be secured by supplying the brake hydraulic pressure. On the other hand, when the hydraulic pressure difference is a negative value, this means that the regenerative braking force is sufficiently secured for the requested braking force, and the brake hydraulic pressure does not have to be supplied. Therefore, a braking force calculation portion 403$k$ extracts the larger one of zero and the hydraulic pressure difference as a braking force that should be secured by supplying the brake hydraulic pressure. A braking force-hydraulic pressure conversion portion 4031 converts the braking force that should be secured by supplying the brake hydraulic pressure into the brake hydraulic pressure, and outputs it to the brake hydraulic unit 90 as the brake hydraulic pressure instruction Px. The brake hydraulic unit 90 generates the hydraulic pressure based on the brake hydraulic pressure instruction Px in each of the wheel cylinders.

(Details of Vehicle Control Unit) A driver request torque calculation portion 101 calculates a driver's request torque Td based on the accelerator position APO and the vehicle speed VSP. The driver request torque Td is set to a larger value as the accelerator position APO increases. Further, when the acceleration position APO is equal to or lower than a predetermined value indicating the release of the foot, an accelerator de-actuation regenerative braking force, which is a predetermined torque on the deceleration side (a negative value) imitating an engine brake, is set. Further, when the vehicle speed matches or falls below the predetermined vehicle speed, the vehicle control unit performs pitching suppressing processing for suppressing pitching generated on the vehicle by reducing the accelerator de-actuation regenerative braking force toward zero to reduce the deceleration immediately before the vehicle is stopped.

Figure 4:
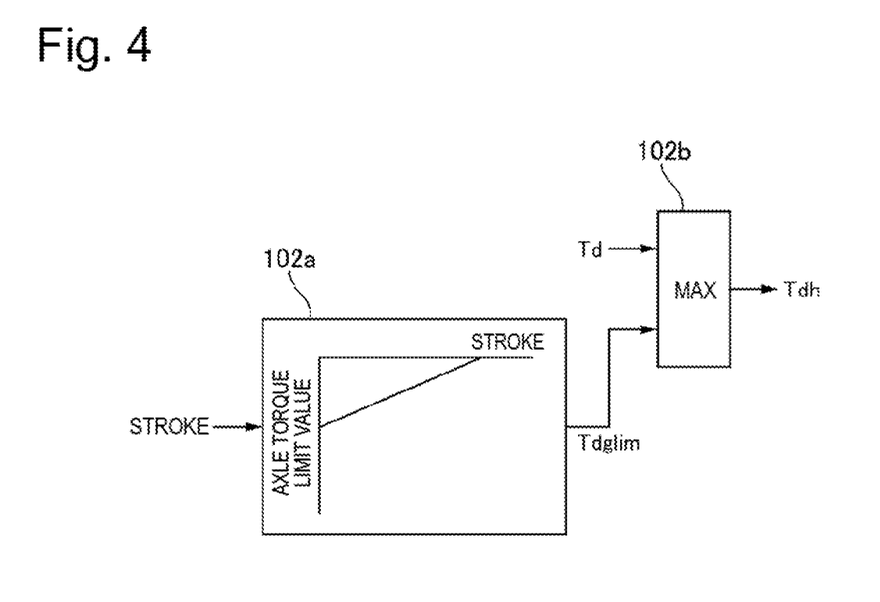
FIG. 4 is a control block diagram illustrating an accelerator de-actuation regenerative braking force correction portion according to the first embodiment.

An accelerator de-actuation regenerative braking force correction portion 102 is a correction portion that imposes a limit on the accelerator de-actuation regenerative braking force when the brake pedal is pressed (hereinafter also referred to as brake actuation) during the regenerative braking according to the de-actuation of the accelerator. FIG. 4 is a control block diagram illustrating the accelerator de-actuation regenerative braking force correction portion according to the first embodiment. An axle torque limit value calculation portion 102$a$ inputs "the pedal stroke" Stroke and calculates an axle torque limit value Tdglim based on a preset map. The axle torque limit value Tdglim is set in such a manner that the regenerative braking force has a smaller absolute value as the brake pedal stroke Stroke increases. In other words, because the axle torque limit value Tdglim is a negative value, a larger value (closer to zero) is set as the brake pedal stroke Stroke increases.

A corrected axle torque setting portion 102$b$ outputs the larger one of the request torque Td and the axle torque limit value Tdglim as a corrected request torque Tdh. Now, the corrected axle torque setting portion 102$b$ compares positive values in the case of the driving torque and negative values in the case of the regenerative torque, and therefore the axle torque limit value Tdglim is set as the corrected axle torque Tdh, for example, when both the request torque Td and the axle torque limit value Tdglim output negative values, and the absolute value of the request torque Td is larger than the absolute value of the axle torque limit value Tdglim. In other words, when the return of the pressed accelerator pedal is detected, the accelerator de-actuation regenerative braking force (hereinafter also referred to as a first regenerative braking force) is set based on a negative region in a driver request torque instruction map. After that, when the brake pedal is pressed and the brake pedal stroke Stroke increases, the corrected request torque Tdh is set to a value resulting from limiting the value of the absolute value to the axle torque limit value Tdglim smaller than the first regenerative braking force (hereinafter also referred to as a second regenerative braking force). This means the same as increasing a third regenerative braking force as the brake pedal stroke Stroke increases, when the third regenerative braking force is defined to be a difference between the first regenerative braking force and the second regenerative braking force.

A regenerative torque reception portion 103 receives the request regenerative torque Trg based on the request braking torque calculated by the regenerative cooperation control portion 403, and further corrects the corrected request torque Tdh. Then, the regenerative torque reception portion 103 outputs an axle torque instruction value of the electric motor 1 that is acquired from the respective instruction values of the driver request torque calculation portion 101, the accelerator de-actuation regenerative braking force correction portion 102, and the regenerative torque reception portion 103 as the vehicle request torque Tt. Therefore, when the brake pedal is pressed and there is room for generating the regenerative braking force after the accelerator de-actuation braking force is set, the brake actuation braking force is achieved by the cooperative control based on the frictional braking force due to the brake hydraulic pressure and the regenerative braking force, and the energy can be efficiently collected.

A torque limit portion 106 calculates a first torque instruction value Tt1 limited based on a positive torque limit value Tplim and a negative torque limit value Tnlim (hereinafter, these limit values will be referred to as torque limit values Tlim) selected by a torque limit value selection portion 205, which will be described below. In other words, an acceleration reference motor torque instruction value Ttfry is corrected so as to fall within a range defined by the torque limit values Tlim.

A slip control portion 108 determines whether a slip has occurred on a wheel based on the wheel speed sv, the longitudinal acceleration Xg, and a torque instruction value of a temperature protection portion 302$f$, which will be described below, and calculates a torque limit amount directed to the torque of the motor connected to the wheel that has slipped when the slip has occurred (including both a driving slip and a braking slip).

A final torque limit portion 109 outputs, to the motor 1, a final torque instruction value Tt3 determined based on the torque limit amount calculated by the slip control portion 108 with respect to a second torque instruction value Tt2.

A maximum torque limit value calculation portion 200 calculates a positive torque limit value Tplimt and a negative torque limit value Tnlimt (hereinafter, Tplimt and Tnlimt will also be referred to as maximum torque limit values Tlimax) of the electric motor 1 based on a rotational speed Vmf of the electric motor 1$f$. The torque characteristic with respect to the rotational speed of the motor is predetermined, and these limit values are determined by setting a maximum outputtable torque value with respect to some rotational speed based on a map or the like.

A first torque limit value calculation portion 204 calculates a positive torque limit value Tplimw and a negative torque limit value Tnlimw (hereinafter, Tplimw and Tnlimw will also be referred to as first torque limit values Tlimw) according to a battery electric potential Vbat of the high-voltage battery BAT, the rotational speed Vmf, and a second electric power limit value Wlim2.

A torque limit value selection portion 205 selects the lower limit value from the maximum torque limit value Tlimmax and the first torque limit values Tlimw, and outputs it as a torque limit value Tlim.

Figure 5:
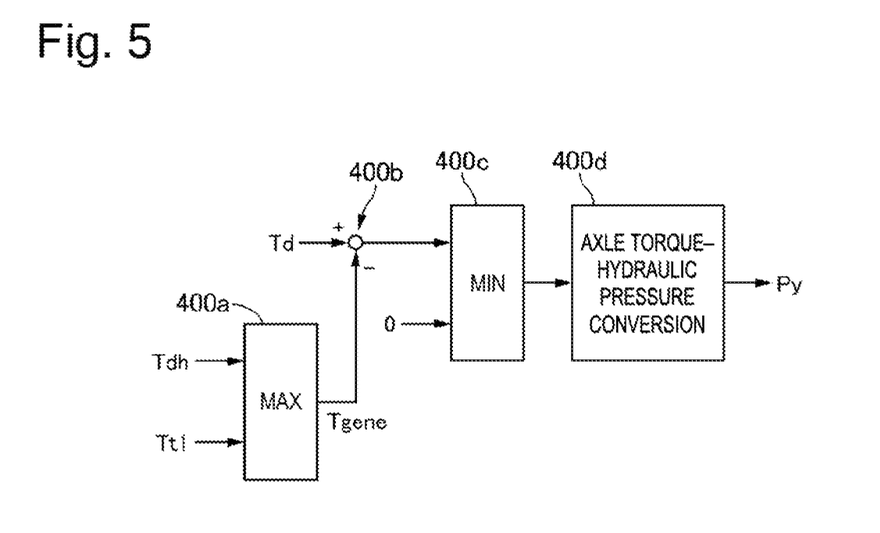
FIG. 5 is a control block diagram illustrating a regenerative-braking braking force compensation portion according to the first embodiment.

A regeneration limit braking force compensation portion 400 calculates the braking force compensation hydraulic pressure Py based on the first torque instruction value Tt1, the driver request torque Td, and the corrected request torque Tdh. FIG. 5 is a control block diagram illustrating the regenerative-braking braking force compensation portion according to the first embodiment. A regenerative torque limit value selection portion 400a selects and outputs the larger one of the corrected request torque Tdh and the first torque instruction value Tt1 (hereinafter referred to as a regenerative torque Tgene). Since the regenerative torque is a negative value, the larger one of the torques means the torque having a larger absolute value. A hydraulic pressure compensation calculation portion 400b subtracts the regenerative torque Tgene from the driver request torque Td, thereby calculating the compensation for the hydraulic pressure by which the regenerative torque falls short of the request torque Td. A limiter portion 400c selects and outputs the smaller one of the compensation for the hydraulic pressure that is output from the hydraulic pressure compensation calculation portion 400b and zero. This is because, if the compensation for the hydraulic pressure is a positive value, the brake hydraulic pressure does not have to be generated. A torque-hydraulic pressure conversion portion 400d converts the torque for compensating for the hydraulic pressure into a brake hydraulic pressure, and outputs the braking force compensation hydraulic pressure instruction value Py.

When the compensation for the hydraulic pressure is a negative value at the time of the regenerative braking, this indicates that, when the driver is detected to be in a state separating his/her foot from the accelerator pedal by the accelerator sensor 7 and an accelerator de-actuation regenerative torque request corresponding to the engine brake is output, the reference motor torque instruction value Tt is limited by the negative torque limit value Tnlim, or the first torque instruction value Tt1 (<Ttfr) closer to zero than the negative torque limit value Tnlim or the corrected requested torque Tdh is output. At this time, the compensation for the hydraulic pressure can be compensated for by the brake hydraulic pressure.

The motor control unit MCU includes a torque limit portion 301, the temperature protection portion 302, and the vibration damping control portion 303. The torque limit portion 301 calculates a motor torque instruction value Tt4 limited based on the final torque instruction value Tt3 output from the final torque limit portion 109 and the torque limit value Tlim output from the torque limit value selection portion 205. The temperature protection portion 302 limits the motor to a motor torque instruction value Tt5 limited in such a manner that the motor has a predetermined or lower temperature, according to a heat generation amount calculated based on a value of an electric current supplied to the motor and a value measured by a temperature sensor mounted on the motor. The vibration damping control portion 303 calculates a vibration damping torque for damping a vibration generated on the drive shaft 4, adds the vibration damping torque to the motor torque instruction value, and finally performs the motor torque control.

Figure 6:
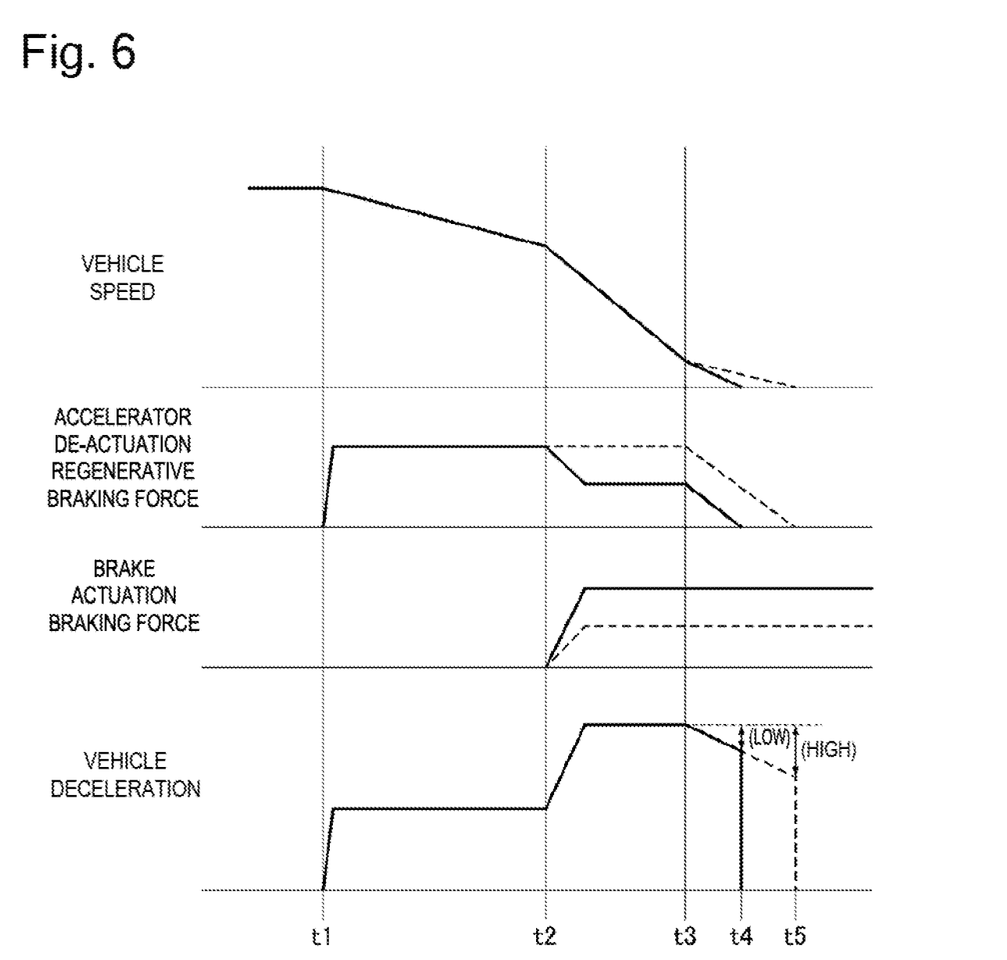
FIG. 6 is a timing chart since the brake is actuated with the accelerator de-actuation regenerative braking force generated until the vehicle is stopped.

FIG. 6 is a timing chart since the brake is actuated with the accelerator de-actuation regenerative braking force generated until the vehicle is stopped. A dotted line in FIG. 6 indicates a timing chart when the accelerator de-actuation regenerative braking force correction portion 102 is not executed (hereinafter referred to as a comparative example), and a solid line indicates a timing chart when the accelerator de-actuation regenerative braking force is corrected according to the first embodiment.

At time t1, when the driver releases the accelerator pedal and generates the accelerator de-actuation regenerative braking force, the vehicle speed gradually reduces.

At time t2, when the driver presses the brake pedal and generates the brake actuation braking force, the vehicle deceleration increases. At this time, in the case where the accelerator de-actuation regenerative braking force is not corrected, the value of the accelerator de-actuation regenerative braking force is unchanged, and the brake hydraulic pressure is generated so as to meet the deceleration requested by the driver.

Figure 7:
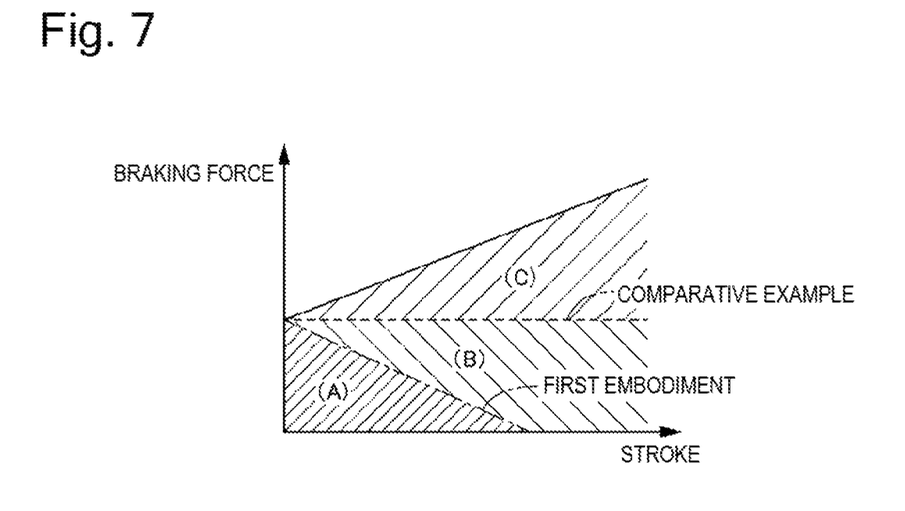
FIG. 7 illustrates a characteristic indicating the relationship between a braking force and a brake stroke.

At time t3, when the vehicle speed reaches a predetermined vehicle speed at which the vehicle will run immediately before the vehicle is stopped, the vehicle control unit CU reduces the accelerator de-actuation regenerative braking force toward zero to prevent pitching that otherwise would occur when the vehicle is stopped. FIG. 7 illustrates a characteristic indicating the relationship between the braking force and the brake stroke. The comparative example adds the brake actuation braking force without reducing the accelerator de-actuation regenerative braking force when the brake is actuated. Therefore, when the regenerative braking force reduces toward zero, the comparative example causes the braking force to reduce by an amount corresponding to the accelerator de-actuation regenerative braking force (an amount corresponding to the first regenerative braking force), thereby causing the braking force to reduce by a large amount (the dotted line at the vehicle deceleration in FIG. 6), thus easily leaving the driver with an impression that the deceleration is diminished and raising a possibility of evoking an uncomfortable feeling. In other words, as illustrated in FIG. 7, in the comparative example, even when the brake pedal stroke Stroke increases, the accelerator de-actuation regenerative braking force is kept constant (a value resulting from adding a region A and a region B in FIG. 7 corresponds to the accelerator de-actuation regenerative braking force), and may fail to match the driver's braking intension.

On the other hand, in the case of the first embodiment, the vehicle control unit CU reduces the accelerator de-actuation regenerative braking force (the first regenerative braking force) to the second regenerative braking force, which is smaller than the first regenerative braking force by the amount corresponding to the third regenerative braking force, and sets a relatively large brake actuation braking force. In other words, as illustrated in FIG. 7, in the comparative example, the accelerator de-actuation regenerative braking force reduces as the brake pedal stroke Stroke increases, and a value that is a sum of the region B and a region C in FIG. 7 is generated as the brake actuation braking force and a value corresponding to the region A is generated as the accelerator de-actuation regenerative braking force. Therefore, even when reducing the regenerative braking force toward zero, the first embodiment allows the braking force to reduce only by an amount corresponding to the second regenerative braking force, thereby allowing the braking force to reduce by a smaller amount (the solid line at the vehicle deceleration in FIG. 6) and thus preventing the driver from feeling that the deceleration is diminished. In other words, when the driver has a strong braking intension, the first embodiment allows the braking result to match the driver's braking intension by preventing the actuation leading to the diminishment of the deceleration. Further, as the ratio of the brake actuation braking force to the total braking force increases, the change in the deceleration can more closely follow the driver's brake pedal operation, and therefore the controllability can be improved.

Figure 8:
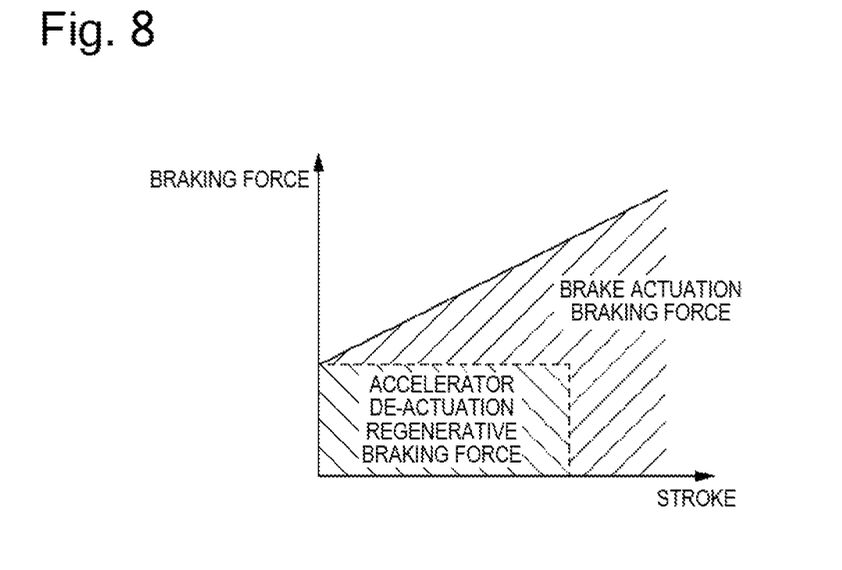
FIG. 8 illustrates a characteristic indicating the relationship between the braking force and the brake stroke according to another embodiment.

In the first embodiment, the vehicle control unit CU reduces the accelerator de-actuation regenerative braking force according to the brake pedal stroke Stroke as indicated by an alternate long and short dash line FIG. 7. However, for example, as illustrated in FIG. 8, the vehicle control unit CU may generate the accelerator de-actuation regenerative braking force until the brake pedal reaches a predetermined brake pedal stroke Stroke, and reduce the accelerator de-actuation regenerative braking force to zero to switch the braking force to entirely rely on the brake actuation braking force when the brake pedal stroke reaches the predetermined brake pedal stroke Stroke or more. In this case, the vehicle control unit CU can prevent the braking force from reducing even when the vehicle speed reaches the predetermined vehicle speed at which the vehicle will run immediately before being stopped. The control according to the present first embodiment can be determined to be in operation if the regenerative braking force reduced just before the vehicle is stopped is smaller than the regenerative braking force at the beginning of the generation of the accelerator de-actuation regenerative braking force as a result of comparing the regenerative braking force at the beginning of the generation of the accelerator de-actuation regenerative braking force and the regenerative braking force reduced just before the vehicle is stopped.

Further, in the timing chart illustrated in FIG. 6, the comparative example and the first embodiment are compared with each other assuming that they match each other in terms of the reduction gradient when reducing the accelerator de-actuation regenerative braking force immediately before the vehicle is stopped, but the comparative example may have a higher reduction gradient than the embodiment or the embodiment may have a lower reduction gradient than the comparative example. Further, the reduction gradient may be set in such a manner that the vehicle is stopped after a predetermined time has passed after the vehicle speed reaches the predetermined vehicle speed at which the vehicle will run immediately before being stopped, when the reduction gradient is set. In this case, if the accelerator de-actuation regenerative braking force is reduced to prevent the pitching by a large amount, this reduction would leave the driver with a further strong impression that the deceleration is diminished, thereby easily evoking an uncomfortable feeling of the driver. Further, the vehicle control unit CU simply reduces the braking force by the amount corresponding to the accelerator de-actuation regenerative braking force and keeping the brake actuation braking force constant in the first embodiment, but may increase the brake actuation braking force according to the reduction in the accelerator de-actuation regenerative braking force.

In the above-described manner, the first embodiment can bring about advantageous effects that will be listed now.

(1) The first embodiment is the control apparatus for the electric vehicle including the electric motor 1 configured to provide the regenerative braking force to the wheel of the vehicle. The control apparatus outputs the instruction to generate the first regenerative braking force, which is the accelerator de-actuation regenerative braking force corresponding to the regenerative braking force, on the electric motor 1 when the signal regarding the return of the pressed accelerator pedal is input from the accelerator pedal sensor 7. The accelerator pedal sensor 7 is configured to detect the physical amount regarding the stroke of the accelerator pedal of the electric vehicle. The control apparatus outputs the instruction to generate the brake actuation braking force on the wheel when the signal regarding the pressing of the brake pedal is input from the brake pedal sensor 6. The brake pedal sensor 6 is configured to detect the physical amount regarding the stroke of the brake pedal of the vehicle. The control apparatus outputs, to the electric motor 1, the instruction to reduce the total value of the accelerator de-actuation regenerative braking force and the brake actuation braking force by the braking force corresponding to the second regenerative braking force, which is a regenerative braking force smaller than the accelerator de-actuation regenerative braking force, when an output value lower than the predetermined speed is input from the vehicle speed sensor 14 (a vehicle body speed detection sensor). The vehicle speed sensor 14 is configured to detect the physical amount regarding the vehicle body speed of the vehicle.

Therefore, the control apparatus can prevent the driver from feeling that the deceleration is diminished just before the vehicle is stopped. The brake actuation braking force is defined to include both the frictional braking force generated by the brake hydraulic unit 90 and the regenerative braking force due to the regenerative cooperation in the first embodiment, but may be defined to be entirely the frictional braking force. In any case, the control apparatus can prevent the driver from feeling that the deceleration is diminished by performing control so as to less reduce the regenerative braking force supposed to be reduced just before the vehicle is stopped, when comparing the regenerative braking force at the beginning of the generation of the accelerator de-actuation regenerative braking force and the regenerative braking force supposed to be reduced just before the vehicle is stopped after the brake pedal is pressed. Further, the control apparatus compares the brake hydraulic pressure immediately before the vehicle is stopped that will be generated when the predetermined brake pedal stroke Stroke is generated in a running mode for generating the accelerator de-actuation regenerative braking force (for example, the One-Pedal mode), and the brake hydraulic pressure immediately before the vehicle is stopped that will be generated when the predetermined brake pedal stroke Stroke is generated in a running mode not generating the accelerator de-actuation regenerative braking force (for example, the neutral range). Then, if the brake hydraulic pressure is higher in the running mode for generating the accelerator de-actuation regenerative braking force, this means that the present control is in operation, and the advantageous effects of the present control are acquired.

(2) The control apparatus outputs the instruction to reduce the first regenerative braking force according to the brake pedal stroke Stroke, which is the physical amount regarding the stroke of the brake pedal, to the electric motor 1 and outputs the instruction to add the braking force corresponding to the third regenerative braking force, which is a regenerative braking force corresponding to the amount of the reduction in the first regenerative braking force, to the brake actuation braking force when the signal regarding the pressing of the brake pedal is input after the signal regarding the return of the pressed accelerator pedal is input.

Therefore, the control apparatus can prevent the total braking force from reducing by adding the amount corresponding to the reduction in the accelerator de-actuation regenerative braking force to the brake actuation braking force. In other words, the control apparatus can keep the total braking force equivalent to the conventional example until just before the vehicle is stopped, and prevent only the reduction in the total braking force (the deceleration) just before the vehicle is stopped, thereby preventing the driver from feeling that the deceleration is diminished just before the vehicle is stopped.

(3) The second regenerative braking force is the regenerative braking force provided due to the return of the pressed accelerator pedal.

Therefore, the control apparatus can prevent the driver from feeling that the deceleration is diminished just before the vehicle is stopped.

(4) The control apparatus increases the third regenerative braking force and also increases the brake actuation braking force as the brake pedal stroke Stroke increases when the signal regarding the pressing of the brake pedal is input (refer to FIG. 7).

Therefore, the control apparatus less reduces the accelerator de-actuation regenerative braking force when the brake pedal is lightly pressed because this braking is deemed less urgent, and increases the ratio of the brake actuation braking force as the brake pedal is further pressed. This results in an increase in the change in the deceleration with respect to the operation of returning the brake pedal for preventing the pitching just before the vehicle is stopped, thus contributing to the improvement of the operability. This is because the accelerator de-actuation regenerative braking force cannot be controlled by the brake pedal.

(5) The control apparatus may be configured to increase the third regenerative braking force and also increase the brake actuation braking force when the signal regarding the pressing of the brake pedal is input and the brake pedal stroke Stroke exceeds the predetermined value (refer to FIG. 8).

Similar advantageous effects can also be acquired even when the accelerator de-actuation regenerative braking force is limited to a small braking force as if being switched off when the pressing of the brake pedal reaches the predetermined brake pressing amount.

(6) The third regenerative braking force is determined based on the preset map of the braking force with respect to the brake pedal stroke Stroke.

That is, setting the brake pedal stroke Stroke on the horizontal axis of the correction map leads to the use of a signal directly connected to the driver operation, thereby preventing the adaptation to a vehicle from being affected by conditions specific to the vehicle and thus facilitating the adaptation. Further, setting the braking force on the vertical axis of the correction map eliminates the necessity of changing the correction map even when the characteristic of the brake pedal is changed, thereby facilitating the adaptation to a plurality of vehicles based on a single system.

The brake pedal stroke Stroke is employed as the horizontal axis in the first embodiment, but another parameter may be employed. For example, setting the driver request torque or the driver request hydraulic pressure on the horizontal axis eliminates the necessity of changing the correction map even when the pedal characteristic is changed. However, if the vehicle weight is changed, the correction map should be changed because the relationship with the braking force with respect to the driver request torque is changed in this case. Alternatively, the driver request motor torque may be set on the horizontal axis. This is the same information as the information handled in the control of the driving force, and therefore this setting eliminates the necessity of the conversion in terms of the unit. However, when the motor is changed, the correction map should be changed according to the motor characteristic. Alternatively, the driver request deceleration may be set on the horizontal axis. This setting eliminates the necessity of changing the correction map even when the pedal characteristic or the vehicle is changed. However, it should be noted that the deceleration is changed according to the loaded state.

Further, the braking force instruction may be set on the vertical axis. This setting eliminates the necessity of changing the correction map even when the pedal characteristic is changed. However, when the vehicle is changed, the correction map should be changed because the weight is changed in this case. Alternatively, the hydraulic instruction may be set on the vertical axis. This is the same information as the information handled in the brake control, and therefore this setting eliminates the necessity of the conversion in terms of the unit. However, when the vehicle is changed, the correction map should be changed because the braking force with respect to the hydraulic pressure is different in this case. Alternatively, the motor torque instruction may be set on the vertical axis. In this case, the motor torque instruction is the same information as the information handled in the control of the driving force, and therefore this setting eliminates the necessity of the conversion in terms of the unit. However, when the vehicle or the speed reducer is changed, the correction map should be changed. Alternatively, the deceleration instruction may be set on the vertical axis. In this case, the correction map may be set as a fixed map, but it should be noted that the deceleration is changed according to the loaded state.

(7) The brake actuation braking force is the sum of the regenerative braking force and the frictional braking force.

Therefore, the control apparatus can effectively utilize the regenerative braking force and efficiently collect the energy by incorporating the regenerative cooperation into the brake actuation braking force.

(8) The control apparatus conducts the replacement for increasing the frictional braking force according to the reduction in the regenerative braking force with respect to the brake actuation braking force.

Therefore, the control apparatus improves the controllability by using the frictional braking force alone as the brake actuation braking force as the vehicle is being braked and being stopped.

In the following description, embodiments recognizable from the above-described embodiment will be described.

One embodiment is a control apparatus for an electric vehicle including a wheel and an electric motor configured to provide a regenerative braking force to this wheel. The control apparatus outputs an instruction to generate a first regenerative braking force corresponding to the regenerative braking force on the electric motor when a signal regarding a return of a pressed accelerator pedal is input from an accelerator pedal sensor. The accelerator pedal sensor is configured to detect a physical amount regarding a stroke of the accelerator pedal of the electric vehicle. The control apparatus outputs an instruction to generate a brake actuation braking force on the wheel when a signal regarding pressing of a brake pedal is input from a brake pedal sensor. The brake pedal sensor is configured to detect a physical amount regarding a stroke of the brake pedal of the electric vehicle. The control apparatus outputs, to the electric motor, an instruction to reduce a total value of the first regenerative braking force and the brake actuation braking force by a braking force corresponding to a second regenerative braking force, which is a regenerative braking force smaller than the first regenerative braking force, when an output value lower than a predetermined speed is input from a vehicle body speed detection sensor. The vehicle body speed detection sensor is configured to detect a physical amount regarding a vehicle body speed of the electric vehicle.

According to another embodiment, in the above-described embodiment, the control apparatus outputs an instruction to reduce the first regenerative braking force according to the physical amount regarding the stroke of the brake pedal to the electric motor and outputs an instruction to add a braking force corresponding to a third regenerative braking force, which is a regenerative braking force corresponding to an amount of the reduction in the first regenerative braking force, to the brake actuation braking force when the signal regarding the pressing of the brake pedal is input after the signal regarding the return of the pressed accelerator pedal is input.

According to another embodiment, in any of the above-described embodiments, the second regenerative braking force is a regenerative braking force provided due to the return of the pressed accelerator pedal.

According to further another embodiment, in any of the above-described embodiments, the control apparatus increases the third regenerative braking force and also increases the brake actuation braking force as the physical amount regarding the stroke of the brake pedal increases when the signal regarding the pressing of the brake pedal is input.

According to further another embodiment, in any of the above-described embodiments, the control apparatus increases the third regenerative braking force and also increases the brake actuation braking force when the signal regarding the pressing of the brake pedal is input and the physical amount regarding the stroke of the brake pedal exceeds a predetermined value.

According to further another embodiment, in any of the above-described embodiments, the third regenerative braking force is determined based on a preset map of a braking force with respect to an amount of the stroke of the brake pedal.

According to further another embodiment, in any of the above-described embodiments, the brake actuation braking force is a sum of the regenerative braking force and a frictional braking force.

According to further another embodiment, in any of the above-described embodiments, the control apparatus conducts replacement for increasing the frictional braking force according to the reduction in the regenerative braking force with respect to the brake actuation braking force.

Further, from another aspect, one embodiment is a control method for an electric vehicle including a wheel and an electric motor configured to provide a regenerative braking force to this wheel. The control method for the electric vehicle includes outputting an instruction to generate a first regenerative braking force corresponding to the regenerative braking force on the electric motor when a signal regarding a return of a pressed accelerator pedal is input from an accelerator pedal sensor configured to detect a physical amount regarding a stroke of the accelerator pedal of the electric vehicle, outputting an instruction to generate a brake actuation braking force on the wheel when a signal regarding pressing of a brake pedal is input from a brake pedal sensor configured to detect a physical amount regarding a stroke of the brake pedal of the electric vehicle, and outputting, to the electric motor, an instruction to reduce a total value of the first regenerative braking force and the brake actuation braking force by a braking force corresponding to a second regenerative braking force, which is a regenerative braking force smaller than the first regenerative braking force, when an output value lower than a predetermined speed is input from a vehicle body speed detection sensor configured to detect a physical amount regarding a vehicle body speed of the electric vehicle.

Further, from another aspect, a control system for an electric vehicle includes an electric motor configured to provide a regenerative braking force to a wheel of the electric vehicle, an accelerator pedal sensor configured to detect a physical amount regarding a stroke of an accelerator pedal of the electric vehicle, a brake pedal sensor configured to detect a physical amount regarding a stroke of a brake pedal of the electric vehicle, a vehicle body speed detection sensor configured to detect a physical amount regarding a vehicle body speed of the electric vehicle, and a control portion configured to output an instruction to generate a first regenerative braking force corresponding to the regenerative braking force on the electric motor when a signal regarding a return of the pressed accelerator pedal is input from the accelerator pedal sensor, output an instruction to generate a brake actuation braking force on the wheel when a signal regarding pressing of the brake pedal is input from the brake pedal sensor, and output an instruction to reduce a total value of the first regenerative braking force and the brake actuation braking force by a braking force corresponding to a second regenerative braking force, which is a regenerative braking force smaller than the first regenerative braking force, to the electric motor when an output value lower than a predetermined speed is input from the vehicle body speed detection sensor.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2018-4437 filed on Jan. 15, 2018. The entire disclosure of Japanese Patent Application No. 2018-4437 filed on Jan. 15, 2018 including the specification, the claims, the drawings, and the abstract is incorporated herein by reference in its entirety.

REFERENCE SIGN LIST

FL, FR front wheel
RL, RR rear wheel
1 electric motor
2 speed reduction mechanism
3 differential gear
4 drive shaft
5 inverter
6 brake pedal sensor
7 accelerator position sensor
8 resolver
9 brake controller
10 wheel speed sensor
11 CAN communication line (communication apparatus)
12 acceleration sensor 90 brake hydraulic unit
CU vehicle control unit
BCU battery control unit
MCU motor control unit

The invention claimed is:

1. An apparatus comprising:
a control apparatus for an electric vehicle, the electric vehicle including a wheel and an electric motor configured to provide a regenerative braking force to this wheel, wherein
the control apparatus outputs an instruction to generate a first regenerative braking force corresponding to the regenerative braking force on the electric motor when a signal regarding a return of a pressed accelerator pedal is input from an accelerator pedal sensor, the accelerator pedal sensor being configured to detect a physical amount regarding a stroke of the accelerator pedal of the electric vehicle;
the control apparatus outputs an instruction to generate a brake actuation braking force on the wheel when a signal regarding pressing of a brake pedal is input from a brake pedal sensor, the brake pedal sensor being configured to detect a physical amount regarding a stroke of the brake pedal of the electric vehicle;
the control apparatus outputs, to the electric motor, an instruction to reduce a total value of the first regenerative braking force and the brake actuation braking force to a braking force corresponding to a second regenerative braking force, which is a regenerative braking force smaller than the first regenerative braking force, when an output value lower than a predetermined speed is input from a vehicle body speed detection sensor, the vehicle body speed detection sensor being configured to detect a physical amount regarding a vehicle body speed of the electric vehicle; and
the control apparatus outputs an instruction to reduce the first regenerative braking force according to the physical amount regarding the stroke of the brake pedal to the electric motor and outputs an instruction to add a braking force corresponding to a third regenerative braking force, which is a regenerative braking force corresponding to an amount of the reduction in the first regenerative braking force, to the brake actuation braking force when the signal regarding the pressing of the brake pedal is input after the signal regarding the return of the pressed accelerator pedal is input.

2. The apparatus according to claim 1, wherein the second regenerative braking force is a regenerative braking force provided due to the return of the pressed accelerator pedal.

3. The apparatus according to claim 1, wherein the control apparatus increases the third regenerative braking force and also increases the brake actuation braking force as the physical amount regarding the stroke of the brake pedal increases when the signal regarding the pressing of the brake pedal is input.

4. The apparatus according to claim 1, wherein the control apparatus increases the third regenerative braking force and also increases the brake actuation braking force when the signal regarding the pressing of the brake pedal is input and the physical amount regarding the stroke of the brake pedal exceeds a predetermined value.

5. The apparatus according to claim 1, wherein the third regenerative braking force is determined based on a preset map of a braking force with respect to an amount of the stroke of the brake pedal.

6. The apparatus according to claim 1, wherein the brake actuation braking force is a sum of a regenerative braking force and a frictional braking force.

7. The apparatus according to claim 6, wherein the control apparatus conducts replacement for increasing the frictional braking force according to the reduction in a regenerative braking force with respect to the brake actuation braking force.

8. A control method for an electric vehicle, the electric vehicle including a wheel and an electric motor configured to provide a regenerative braking force to this wheel, the control method for the electric vehicle comprising:
outputting an instruction to generate a first regenerative braking force corresponding to the regenerative braking force on the electric motor when a signal regarding a return of a pressed accelerator pedal is input from an accelerator pedal sensor, the accelerator pedal sensor being configured to detect a physical amount regarding a stroke of the accelerator pedal of the electric vehicle;
outputting an instruction to generate a brake actuation braking force on the wheel when a signal regarding pressing of a brake pedal is input from a brake pedal sensor, the brake pedal sensor being configured to detect a physical amount regarding a stroke of the brake pedal of the electric vehicle;
outputting, to the electric motor, an instruction to reduce a total value of the first regenerative braking force and the brake actuation braking force to a braking force corresponding to a second regenerative braking force, which is a regenerative braking force smaller than the first regenerative braking force, when an output value lower than a predetermined speed is input from a vehicle body speed detection sensor, the vehicle body speed detection sensor being configured to detect a physical amount regarding a vehicle body speed of the electric vehicle; and
outputting an instruction to reduce the first regenerative braking force according to the physical amount regarding the stroke of the brake pedal to the electric motor and outputs an instruction to add a braking force corresponding to a third regenerative braking force, which is a regenerative braking force corresponding to an amount of the reduction in the first regenerative braking force, to the brake actuation braking force when the signal regarding the pressing of the brake pedal is input after the signal regarding the return of the pressed accelerator pedal is input.

9. A control system for an electric vehicle comprising:
an electric motor configured to provide a regenerative braking force to a wheel of the electric vehicle;
an accelerator pedal sensor configured to detect a physical amount regarding a stroke of an accelerator pedal of the electric vehicle;
a brake pedal sensor configured to detect a physical amount regarding a stroke of a brake pedal of the electric vehicle;
a vehicle body speed detection sensor configured to detect a physical amount regarding a vehicle body speed of the electric vehicle; and
a control portion configured to
output an instruction to generate a first regenerative braking force corresponding to the regenerative braking force on the electric motor when a signal regarding a return of the pressed accelerator pedal is input from the accelerator pedal sensor, output an instruction to generate a brake actuation braking force on the wheel when a signal regarding pressing of the brake pedal is input from the brake pedal sensor, output an instruction to reduce a total value of the first regenerative braking force and the brake actuation braking force to a braking force corresponding to a second regenerative braking force, which is a regenerative braking force smaller than the first regenerative braking force, to the electric motor when an output value lower than a predetermined speed is input from the vehicle body speed detection sensor, and output an instruction to reduce the first regenerative braking force according to the physical amount regarding the stroke of the brake pedal to the electric motor and output an instruction to add a braking force corresponding to a third regenerative braking force, which is a regenerative braking force corresponding to an amount of the reduction in the first regenerative braking force, to the brake actuation braking force when the signal regarding the pressing of the brake pedal is input after the signal regarding the return of the pressed accelerator pedal is input.

* * * * *